United States Patent
Sato et al.

Patent Number: 5,403,631
Date of Patent: Apr. 4, 1995

[54] ARTIFICIAL MARBLE SHEET, METHOD OF MANUFACTURING THE SAME AND ARTIFICIAL MARBLE MOLDING PRODUCT

[75] Inventors: Yusuke Sato; Ryozo Amano, both of Aichi, Japan

[73] Assignee: Inax Corporation, Tokoname, Japan

[21] Appl. No.: 37,129

[22] Filed: Mar. 25, 1993

[30] Foreign Application Priority Data

Apr. 1, 1992 [JP] Japan ................... 4-079783

[51] Int. Cl.$^6$ ............ B28B 3/12; B29C 39/20; B29C 43/18; B32B 1/02; B32B 33/00; B44F 9/04
[52] U.S. Cl. ................... 428/15; 52/309.1; 156/61; 156/71; 156/242; 156/243; 156/307.1; 264/171; 264/311.11; 264/331.15; 428/35.7; 428/202; 428/204; 428/220; 428/480; 428/542.8
[58] Field of Search ............ 156/61, 71, 242, 243; 264/307.1, 331.11, 331.15, 1, 71; 428/15, 202, 204, 542.8, 220

[56] References Cited

U.S. PATENT DOCUMENTS

| | | | |
|---|---|---|---|
| 3,773,886 | 11/1973 | Starry et al. | 264/245 |
| 4,244,993 | 1/1981 | Platka | 428/15 |
| 4,853,276 | 8/1989 | Kurushima | 428/187 |
| 4,863,782 | 9/1989 | Wang et al. | 428/204 |
| 5,028,459 | 7/1991 | Lathrop | 428/15 |
| 5,093,185 | 3/1992 | Ungar et al. | 428/204 |
| 5,102,716 | 4/1992 | Balmer et al. | 428/158 |
| 5,275,852 | 1/1994 | Jones et al. | 428/15 |
| 5,314,729 | 5/1994 | Ikezoe et al. | 428/15 |

*Primary Examiner*—James C. Cannon
*Attorney, Agent, or Firm*—Kanesaka & Takeuchi

[57] ABSTRACT

An artificial marble sheet is formed of a pair of carrier films, an SMC layer and a resin concrete layer which has plasticity but does not contain glass fibers laminated between the carrier films. A method of manufacturing the artificial marble sheet as defined above which includes forming a resin concrete layer which has plasticity but does not contain glass fiber on a first carrier film, forming an SMC layer on a second carrier film and bringing the resin concrete layer and the SMC layer into an intimate contact to each other. Carrier films are removed from the artificial marble sheet and press molding is applied under heating such that the resin concrete layer is located on the side of the surface of the product.

10 Claims, 4 Drawing Sheets

ARTIFICIAL MARBLE SHEET, METHOD OF MANUFACTURING THE SAME AND ARTIFICIAL MARBLE MOLDING PRODUCT

FIELD OF THE INVENTION

The present invention concerns an artificial marble sheet, a method of manufacturing the same and an artificial marble molding product.

DESCRIPTION OF THE PRIOR ART

Molding products utilizing sheet molding compounds (hereinafter simply referred to as "SMC") have been used generally, for example, for bath tubs, water proof pans, laundry pans, counter tops and decks.

As shown in FIG. 4, an SMC sheet in the prior art has a constitution comprising a pair of carrier films 1 and 2 and an SMC layer 3 interposed therebetween. The SMC layer is a uniform mixture layer in which glass fibers, resins and, if necessary, fillers are blended.

FIG. 3 is a side elevational view showing a method which is most similar among various manufacturing methods for SMC sheet, to a method of manufacturing an artificial marble sheet according to the present invention.

A first carrier film 5 is continuously fed by a conveyor belt 6, on which a layer of a resin paste 7 is formed by a doctor blade 8 and chopped strands 11 are scattered thereon by cutting rovings 9 by a chopper 10.

On the other hand, a layer of a resin paste 13 is also formed on a second carrier film 12 by a doctor blade 14. The second carrier film 12 is disposed opposite to the first carrier film 5 such that the layer of the resin paste 13 is laid over the chopped strands 11 and then they are pressed between compaction rolls 15. By the press contact, the resins constituting the layers of the resin pastes 7, 13 are impregnated into the chopped strands 11 to form a uniform SMC layer. The resultant SMC sheet 16 is taken up by a winding device 17.

Further, the SMC sheet 16 is put to an aging treatment usually at 40°-50° C. for 24-48 hours and hardened such that the SMC layer can be press molded.

For manufacturing a molding product by using the thus manufactured SMC sheet 16, the carrier films 5 and 12 are peeled off, and the remaining portion of the sheet is cut into an appropriate size, arranged properly on a molding die and then press molded under heating.

In the molding products molded from the SMC sheet in the prior art as described above, the glass fibers are uniformly dispersed in the cross sectional direction of the molding products and the products lack in the feeling of transparency or feeling of depth due to the material. Further, since the glass fibers are present as far as the surface layer of the molding products, minute undulating unevenness is present at the surface.

OBJECT AND SUMMARY OF THE INVENTION

An object of the present invention is to overcome the foregoing problems of the SMC sheet in the prior art and provide an artificial marble sheet having a surface layer capable of manufacturing an artificial marble molding product with the feeling of transparency and feeling of depth and having a smooth surface and high quality feeling, a manufacturing method thereof and an artificial marble molding product using such an artificial marble.

The artificial marble sheet according to the present invention comprises a pair of carrier films, an SMC layer and a resin concrete layer which has plasticity but does not contain glass fibers. Both of the layers are laminated and arranged between the films.

A method of manufacturing an artificial marble sheet according to the present invention comprises a step of forming a resin concrete layer which has plasticity but does not contain glass fibers on a first carrier film, and a step of forming an SMC layer on a second carrier film and bringing the resin concrete layer and the SMC layer into an intimate contact to each other.

The artificial marble molding product according to the present invention is prepared by removing the carrier films from the artificial marble sheet of the present invention as described above and then press molding the remaining portion of the layer with the resin concrete layer being situated on the side of the surface of the product.

In the artificial marble sheet according to the present invention, the SMC layer and the resin concrete layer of high transparency are laminated. Accordingly, in the molding product obtained by press molding the laminate, a two layer structure can be attained in which the side of the surface of the product comprises a layer which does not contain glass fibers and has a high transparency derived from the resin concrete layer and a non-transparent FRP layer derived from the SMC layer is disposed to the rear side of the surface layer.

Accordingly, the molding product has a feeling of high transparency at the surface layer, a feeling of depth due to the transparent resin concrete layer at the surface and the non-transparent SMC layer on the rear side, and has a smooth surface and can be treated as high quality product. Especially, when a pattern is applied to the surface, the pattern can be emphasized to obtain a molding product of excellent decorative nature. Further, since the molding product has a high strength reinforced with the FRP layer, reinforcing treatment after molding, such as blowing of glass fibers, for example, by a hand lay-up method is no longer necessary. In addition, such a high quality product of great strength can be manufactured by press molding for once.

According to the method of the present invention, the artificial marble sheet can be manufactured with ease.

DESCRIPTION OF THE PREFERRED EMBODIMENTS

Description will now be made more in details to the present invention with reference to the accompanying drawings.

Figure 1:
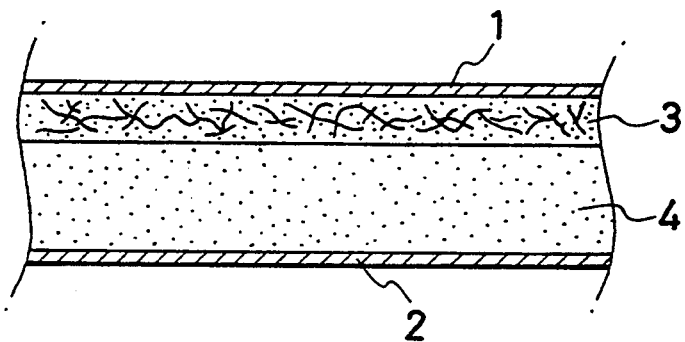
FIG. 1 is a cross sectional view illustrating a preferred embodiment of an artificial marble sheet according to the present invention.
Figure 2:
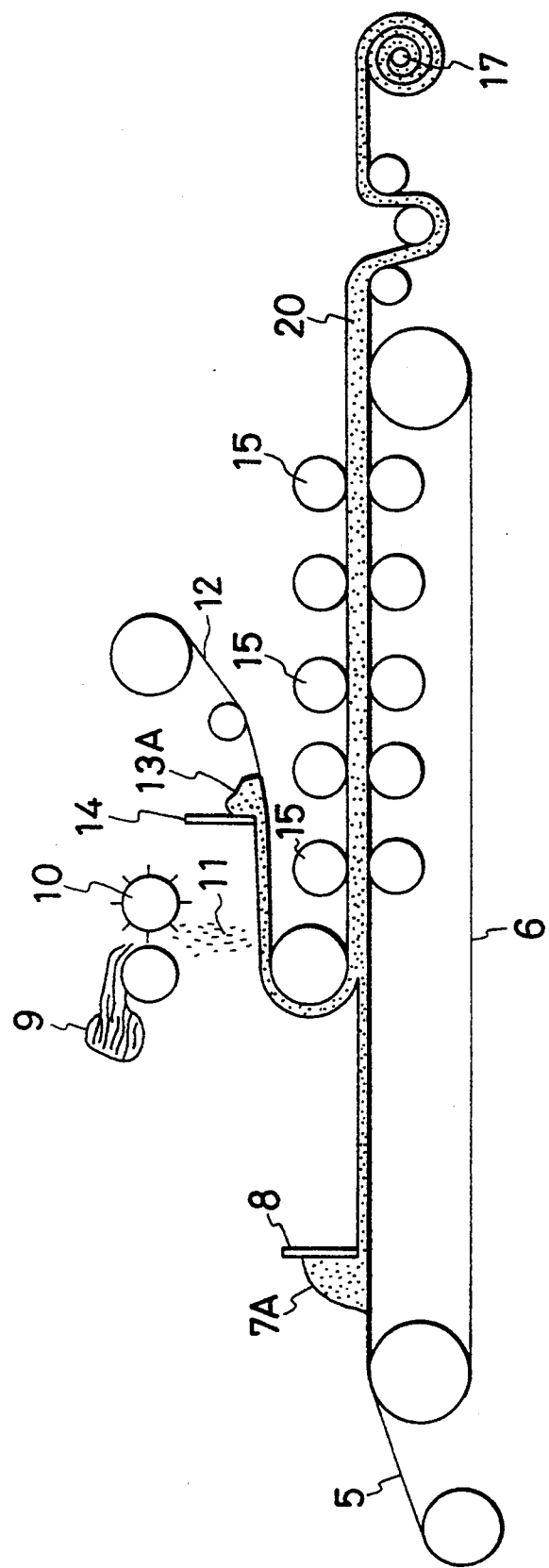
FIG. 2 is a side elevational view illustrating an example of a method of manufacturing an artificial marble sheet according to the present invention.
Figure 3:
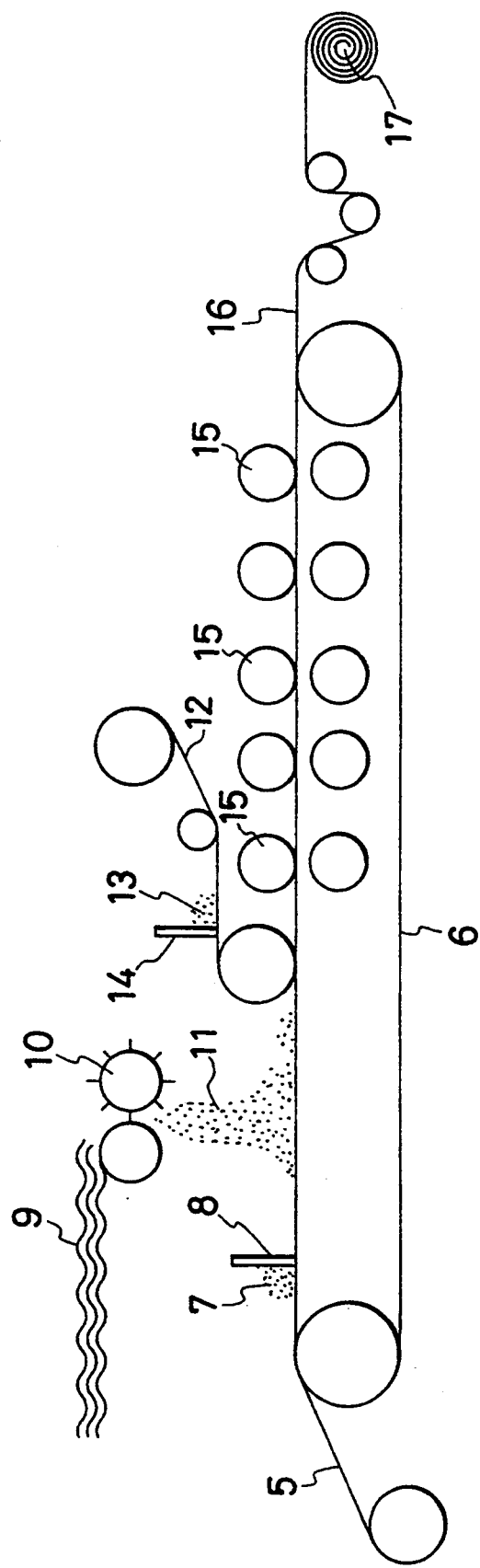
FIG. 3 is a side elevational view illustrating a method of manufacturing an SMC sheet in the prior art.
Figure 4:
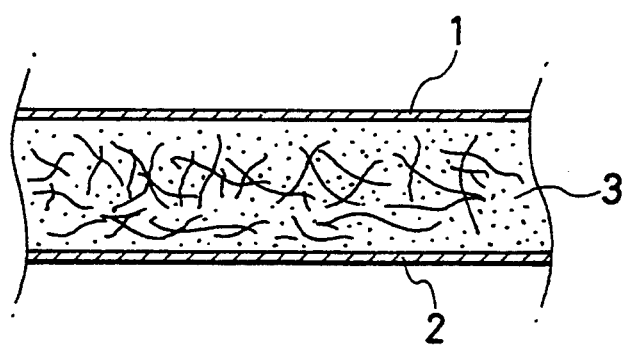
FIG. 4 is a cross sectional view illustrating an SMC sheet in the prior art.

FIG. 1 is a cross sectional view illustrating a preferred embodiment of an artificial marble sheet according to the present invention and FIG. 2 is a side elevational view illustrating an example of a method of manufacturing an artificial marble sheet according to the present invention. In FIGS. 1 and 2, members having the same performances as those in FIGS. 3 and 4 carry the same reference numerals.

As shown in the drawings, the artificial marble sheet according to the present invention comprises a pair of carrier films 1 and 2, and an SMC layer 3 and a resin concrete layer 4 which has plasticity but does not contain glass fibers.

In the artificial marble sheet according to the present invention, the SMC layer 3 can be formed with the same material as those for the SMC layer that constitutes the SMC sheet in the prior art and, specifically, it is prepared by blending a resin such as an unsaturated polyester resin with glass fibers and, if required, fillers such as calcium carbonate, aluminum hydroxide, glass powder, frit and silica beads, viscosity improvers such as magnesium hydroxide, magnesium oxide, calcium hydroxide and calcium oxide, and internal releasing agents such as zinc stearate. The blending amount of the glass fibers is about 5–40% by weight based on the total amount of the SMC layer constituent materials. Further, as the filler, calcium carbonate or aluminum hydroxide is preferred since such material is inexpensive.

On the other hand, the resin concrete layer 4 comprises the material used for the SMC layer described above except for the glass fibers. There is no particular restriction for the kind and the addition amount of the filler, the viscosity improver and other additives. Preferably, it is constituted with the resin of the same material as that for the SMC layer but different resin may also be used. In particular, in a case of making the resin concrete layer transparent, it is important to use colorless filler such as aluminum hydroxide, glass powder, frit and silica beads.

In the present invention, the ratio of the thickness between the SMC and the resin concrete layer is preferably about 1:1 to 10. The entire thickness of the artificial marble sheet according to the present invention is, usually about 5 to 30 mm.

The artificial marble sheet of the present invention can be manufactured with ease in accordance with the method, for example, as shown in FIG. 2.

In the method shown in FIG. 2, a first carrier film 5 is continuously delivered by a conveyor belt 6, on which a layer of a resin paste 7A for forming a resin concrete layer is formed by a doctor blade 8. On the other hand, a layer of resin paste 13A for forming an SMC layer is formed also on a second carrier film 12 by a doctor blade 14, on which chopped strands 11 prepared by cutting roving 9 by a chopper 10 are scattered, and the chopped strands are impregnated into the resin paste 13A. The second carrier film 12 is opposed to the first carrier film 5 such that the layer of the resin paste 13A is laminated with the layer of the resin paste 7A and then they are pressed between the compaction rolls 15. By the press contact, the resin constituting the layer of the resin paste 13A is impregnated into or mixed with the chopped strands 11 to form a homogeneous SMC layer.

On the other hand, the resin constituting the layer of the resin paste 7A is not impregnated into the chopped strands 11 and is put to press contact with the SMC layer to form a laminate sheet 20, which is taken up to a winding device 17. Accordingly, it is important to properly control the viscosity for each of the resin pastes, for example, by adjusting the addition ratio of the viscosity improver or the like, so that the resin paste 13A constituting the SMC layer can be impregnated easily into the chopped strands 11, while the resin paste 7A constituting the resin concrete layer is not impregnated into the chopped strands 11.

The laminate sheet 20 taken up on the winding device 17 is further put to an aging treatment at 40°–50° C. for about 24–48 hours and hardened to such an extent as capable of press molding, to form an artificial marble sheet.

When the artificial marble molding product according to the present invention is manufactured by using the artificial marble sheet of the present invention thus manufactured, the carrier films 5 and 12 are peeled off and the remaining portion of the sheet is cut into an appropriate size, properly arranged on a molding die such that the resin concrete layer is located on a front side of the product and then press molded under heating.

The artificial marble molding product according to the present invention is especially suitable to plate-like press molding products such as counter tops, decks, water proof pans and laundry machine pans. That is, in such plate-like press molding products, the SMC layer and the resin concrete layer are not mixed to each other upon press molding and satisfactory molding products can be obtained.

As has been described above specifically, according to the artificial marble sheet and an artificial marble molding product obtained by molding the sheet, the following excellent advantageous effects can be provided:

(1) Since the surface layer comprises a resin concrete layer not containing glass fibers, a high quality molding product having a smooth surface with no undulation and having feeling of transparency and feeling of depth can be provided.

(2) When a pattern is applied to the surface, the pattern can be emphasized to obtain a product of excellent decorative nature.

(3) Since the rear side is reinforced with the SMC layer, no reinforcing treatment is necessary after molding.

In the method of manufacturing the artificial marble sheet according to the present invention, an artificial marble sheet capable of obtaining an artificial marble molding product having such high performance can be manufactured with ease.

What is claimed is:

1. A precursor for an artificial marble sheet having,, in finished form, a facing layer of high transparency providing an impression of depth, said precursor comprising a pair of carrier films and, laminated between said films, a glass fiber-reinforced sheet molding compound layer comprising a curable resin and a glass fiber-free curable resin layer having plasticity, said glass fiber-free curable resin layer being intended to serve as the facing layer in the finished artificial marble sheet.

2. A precursor as defined in claim 1, wherein the glass fiber-reinforced sheet molding compound layer is prepared by blending the curable resin and glass fibers and a blending amount of the glass fibers is from 5 to 40% by weight based on a total amount of the glass fiber-reinforced sheet molding compound layer.

3. A precursor as defined in claim 1, wherein the glass fiber-free curable resin layer contains a resin as in the curable resin for the glass fiber-reinforced sheet molding compound layer.

4. A precursor as defined in claim 1, wherein a ratio of the thickness between the glass fiber-reinforced sheet molding compound layer and the glass fiber-free curable resin layer is 1:1 to 10.

5. A precursor as defined in claim 1, wherein a thickness of the precursor is 5 to 30 mm.

6. A precursor as defined in claim 1, wherein said glass fiber-reinforced sheet molding compound layer further includes at least one of fillers, viscosity improvers and internal releasing agents, and said glass fiber-free curable resin layer further includes at least one of fillers, viscosity improvers and internal releasing agents.

7. A method of manufacturing a precursor for an artificial marble sheet which comprises:

forming a glass fiber-free curable resin layer having plasticity on a first carrier film, forming a glass fiber-reinforced sheet molding compound layer comprising a curable resin on a second carrier film, and bringing said glass fiber-reinforced and glass fiber-free curable resin-containing layers into intimate contact with one another.

8. A method as defined in claim 7, wherein the glass fiber-reinforced sheet molding compound layer is prepared by forming a layer of the curable resin on the second carrier film, scattering glass fibers thereon and impregnating said glass fibers into said curable resin layer.

9. A method as defined in claim 7, wherein said glass fiber-reinforced and glass fiber-free curable resin-containing layers are hardened by an aging treatment at 40°–50° C. for 24–48 hours.

10. A finished artificial marble sheet produced by removing the carrier films from the precursor defined in claim 1, disposing the carrier film-free precursor in a mold in such a manner that the fiber-free curable resin layer is positioned so as to serve as the facing layer in the finished product, and press-molding the carrier film-free precursor under heating conditions to effect resin cure.

* * * * *